Nov. 18, 1941.    R. C. SCHOCK    2,262,863
LAUTER TANK
Filed June 10, 1939
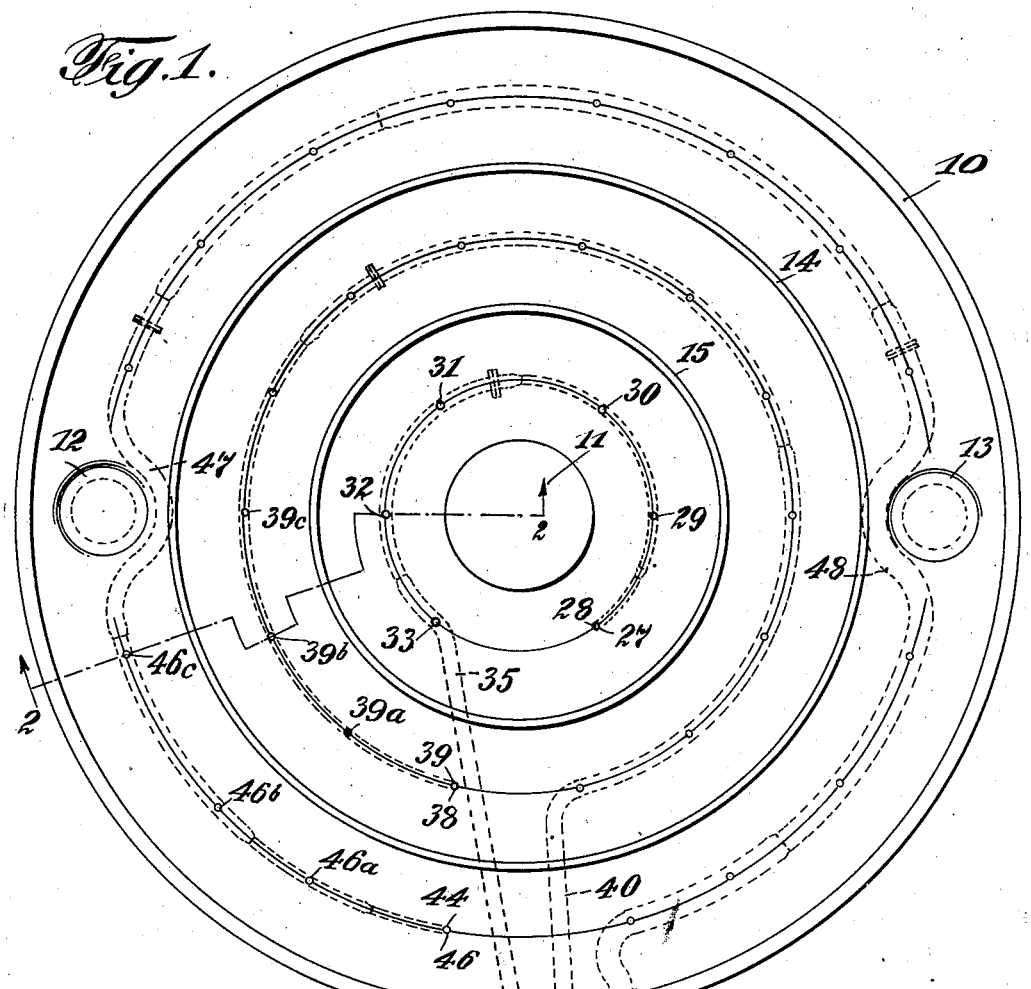
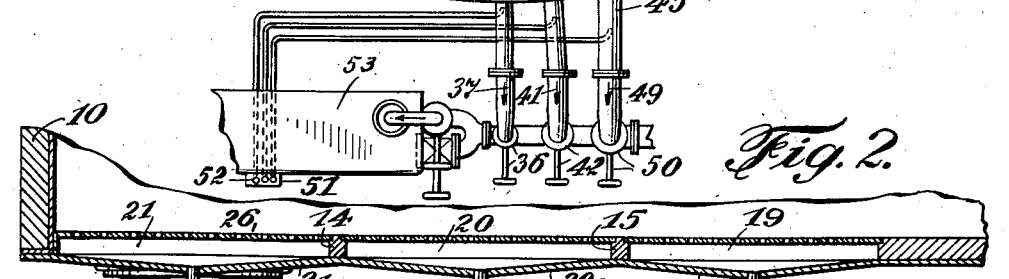
INVENTOR.
Robert C. Schock
By C. P. Goepel
his ATTORNEY.

Patented Nov. 18, 1941

2,262,863

UNITED STATES PATENT OFFICE 2,262,863

LAUTER TANK

Robert C. Schock, New Rochelle, N. Y., assignor to Schock, Gusmer & Co. Inc., Hoboken, N. J., a corporation of New Jersey Application June 10, 1939, Serial No. 278,458

4 Claims. (Cl. 210—149)

This invention relates to lauter tanks, and has for its object to provide a lauter tank with a bottom so disposed as to provide an even drawing off of the wort.

A further object is to provide a lauter tank in which there is relatively no difference in intensity of the wort which is collected after filtering it through the bronze false or inner bottom, so that there is a substantial uniformity of the wort, whether the wort comes from the outside, the middle, or the center of the tank.

Lauter tanks, as is known, are provided with two bottoms, a false or inner bottom which is in the nature of a screen or a perforated plate or a slotted plate permitting the wort to pass therethrough, and a lower bottom which collects the wort that has filtered through the false bottom.

It has heretofore been proposed to remove the wort which is passed through the false bottom, by a large number of separate pipes, one for each subdivision of the lauter tank, and these pipes, generally speaking about twelve to thirty-two in number, having an equal number of discharge valves or cocks, one for each pipe. The control of the wort by means of such a multiplicity of valves was difficult and not at all times possible.

Furthermore, in some of the lauter tanks heretofore used, the outside bottom was entirely flat, and in consequence there would be an adherence of the wort to the bottom, so that the wort would accumulate on such bottoms and bring about a harmful condition of uncleanliness, favorable to the generation of bacteria in undesired quantities, unless carefully cleaned after each use.

The object of the invention here is to provide an outside bottom which prevents a building up of sediment or under dough, and to replace the said multiplicity of pipes and valves by three valves which can be readily controlled and regulated in accordance with the practice of determining the amount of sugar in the wort, and thereby determining the density of flow of the wort as it bypasses through the saccharometer chambers, and in the event that the flow in any of the chambers which is so governed by the three valves is not of the desired order, it can be throttled until the flow shall have been equalized.

For this purpose, the improvements in the lauter tank forming the basis of this invention are, first, the provision of three manifolds concentrically arranged to render each of said manifolds capable of regulation before the wort enters the saccharometer grant. Secondly, the invention consists in providing the outside bottom with a series of concentric channels, each V-shaped in cross-section, the apex of the V being provided with the outlet pipes which discharge the wort into the aforesaid manifolds, such V-shape formation providing the outside bottom with concentrically disposed inclined walls, to enable a free flow of the wort which is passed through the false bottom in such a manner as to maintain the inner walls of these V-shaped circumferential members clean of the wort, by promoting faster running thereof and thus to prevent the formation of undesirable accretions of solid matter from the wort, also to aid in preventing under dough and to prevent any possible generation of undesired bacteria.

The invention will be more fully described hereinafter, and embodiments thereof will be shown in the drawing, and the invention will be finally pointed out in the claims.

In the accompanying drawing:

Figure 1 is a plan view of a lauter tank embodying the improvements;

Figure 2 is an enlarged section taken on line 2—2 of Figure 1, only one-half of the lauter tank being shown in order to enable the drawing to represent the enlargement; and Figure 3 is a partial section similar to Figure 2 but in which the outside bottom is substantially parallel with the false bottom, and in which the manifolds taken from the outside bottom the wort as it is discharged therefrom.

Similar characters of reference indicate corresponding parts throughout the various views.

Referring to the drawing, and more particularly to Figures 1 and 3, the lauter tank as known is a vessel 10 having a central post 11 and grain valve discharges 12 and 13. It is also known to provide, concentric with the outer wall of the vessel or tank, rings 14 and 15 which may be an integral part of the false bottom, or separately formed and secured thereto, and which act as seals whereby the outside bottom is divided into three concentric compartments designated in Figure 3 by the reference characters 16, 17 and 18, and in Figure 2 by 19, 20 and 21. These compartments are formed by the concentric rings 14 and 15 in conjunction with the outside bottom 25 and may be of flat shape as shown in Figure 3, but preferably are of valley-like shape or V-shape, as shown in Figure 2, and are closed by the false bottom or inner bottom 26 which is supported by the concentric rings 14 and 15 and is spaced a short distance above the outside bottom 25 of Figure 3, or the V-shaped bottoms of Figure 2.

The conventional inner or false bottom is usually a slotted bronze part which acts as a mechanical filter to allow the wort to trickle through and thus accomplish a separation of the wort and spent grains. This inner bottom or false bottom, whether formed of bronze or other suitable material, usually consists of a series of fan-shaped plates, and for an eighteen foot diameter tank, it usually consists of twenty plates. It has been a common practice to seal each of these plates to the outside bottom, thus making for example, twenty complete chambers, each chamber being tapped by a copper pipe, and the wort from this chamber was run into a collecting trough. This method offered a number of advantages, amongst other things, an even drawing off of the wort, since when the wort from one or more chambers became low in balling or sugar content, the valves leading from these chambers were closed and the wort continued to be drawn from the other chambers. The outside bottom was a flat bottom and parallel to the inner bottom. The disadvantage of this method was that there developed a difference in intensity of the wort which filters through the false bottom, depending upon whether the wort comes from different parts of the tank. Furthermore, if flat, the plates had the disadvantage of tending to accumulate undesirable accretions of solid matter from the wort.

The improvement, therefore, consists in providing the outside bottom with three concentric V-shaped valleys, the depth of each of the V-shaped valleys being about one inch in a nineteen foot diameter tank. Each of these valleys is sealed circumferentially to the false bottom, thus producing three annular chambers or compartments. Each chamber is connected by wort pipes to a central collecting trough. Such V-shaped chambers allow a quicker running off of the wort with more even extraction, and provide an improved wort.

Below each of the compartments 16, 17 and 18 of Figure 3, or 19, 20 and 21 of Figure 2, there is provided a manifold pipe of circular shape disposed about centrally of each compartment. This manifold pipe preferably is of a gradually increasing diameter from its free end to its final discharge end, since each such manifold pipe must compensate for the increase in the quantity of the wort from its free end to its discharge end.

In Figure 1, the manifold pipe in the innermost compartment has its free end 27 provided with a vertical pipe 28 which receives the wort from the outside bottom 19a of Figure 2 (in case such a bottom is used, this pipe being indicated by 28). Circumferentially disposed in this inner compartment are a plurality of short, vertical pipes, as 29, 30, 31, 32 and 33, and each of these pipes discharges into the manifold, which gradually increases in diameter until such manifold 35 passes forwardly of the lauter tank underneath the same to the valve 36, the arrow 37 showing the direction of movement of the wort. In similar manner but in opposed direction, the manifold of the compartment 20 of Figure 2 has its open end 38 connected with the pipe 39 (to the intermediate compartment 20,) and this second manifold 40 receives its wort from a plurality of spaced pipes 39a, 39b, 39c, etc., disposed circumferentially in spaced relationship on the outside bottom to receive the wort of the outside bottom and to supply such wort to the manifold 40 which guides, as shown by the arrow 41, the wort to the valve 42.

A similar arrangement of a manifold pipe is shown in the third compartment 21, the free end 44 of such manifold 45 having a pipe 46 and spaced pipes 46a, 46b, 46c, etc., preferably equally spaced along the length of the manifold and connecting the manifold 45 with the compartment 21, the manifold 45, in the same manner as the manifold 40, increasing in diameter corresponding to the number of pipes which connect the manifold with the interior of the compartments 19 and 20. The outer manifold 45 has its side portions bent, as shown by 47 and 48, to pass around the grain discharge members 12 and 13, but this curved portion forms no part of the invention. The manifold 45 conducts its wort as shown by the arrow 49 to the valve 50.

It will thus be seen that when a lauter tank is provided with an outside bottom having concentric channels as shown in Figure 2, by the use of three manifolds gradually increasing in diameter it is possible to gather all of the wort desired to be discharged from the lauter tank, as a result of which only three control valves, 36, 42 and 40, are required. When the wort has been received by these valves 36, 42 and 50, the valves are regulated, by the opening or closing of the same, so that all draw the same rate of flow which governs the amount of wort to be passed into the saccharometer box 51. When any one of these manifolds discharges its wort as indicated by the arrows 37, 41, 49 at a balling not such as is desirable for the operation of the lauter tank, the valves 36, 42 and 50 may be manipulated in such a way as to obtain the desired rate of flow. The wort then passes into the saccharometer grant, from which it is conducted in a manner well known. The collecting trough for wort from a lauter tub is known as a grant, indicated by 53. The saccharometer box 51, having chambers and having a saccharometer 52, is fed by a small pipe which leads off of each of the wort manifolds ahead of the valve, and the overflow from the saccharometer box or chambers runs into the grant 53. This set-up allows the operator to control valves 36, 42 and 50, so that the same balling wort is delivered from each manifold. The inclination of the channel walls in the Figure 2 construction will depend somewhat upon the capacity of the tank, the character of the grain, etc., and the copper or other suitable material may be readily shaped as desired.

Thus, it will be seen that with a false bottom 26 and with an outside bottom 25 having concentric V-shaped channels, by the use of the manifolds the gathering of the wort may be remarkably simplified, with the use of only three pipes, and the control of the rate of flow may be had by the use of three valves, thereby providing a distinct advantage in the manufacture of such lauter tanks, and at the same time enabling such lauter tanks to be operated under a better controlled efficiency.

Such provision of a false bottom with V-shaped concentric channels is, however, not intended to exclude the use of a flat false bottom under favorable conditions, as illustrated in Figure 3, for, while such a flat outside bottom has the disadvantage that there may be a tendency toward accumulation of wort, it is possible to obtain an improved flow of wort by the novel provision of three manifolds like those already described. It will be readily understood that in the Figure 2 construction, the pipes 32, etc., will be connected to compartment 16; the pipes 39b, etc., will be connected to compartment 17; and the pipes 46c will be connected to compartment 18, all operating for the purpose, and in the manner, already described.

From the foregoing, it will have been seen that the invention consists of a lauter tank in which there are three separated compartments sealed from each other of known kind, but in which novel manifold assembly the manifolds are arranged concentrically below the bottom of the lauter tank and connected by means of a plurality of short nozzle-like pipes with the compartments so as to draw therefrom the wort and to conduct the wort by these manifolds to a discharge valve, one for each manifold; also that each discharge valve may be readily regulated with respect to the adjacent valve of the next manifold so as to obtain the proper rate of flow. The simplicity of construction thus obtained reduces the expense of operation of lauter tanks, and at the same time secures a more efficient operation of the same.

It will have been seen also that the invention has also for its object to provide the bottoms of the separated compartments with an improved configuration facilitating the flow of the wort and to prevent any accumulation of the wort on such bottoms, whereby a more efficient operation of the lauter tank operation is obtained.

It will have further seen that through the sealing rings it is possible to control the specific gravity of the wort in each collecting manifold, so that while lautering off, this specific gravity will be uniform throughout, for it is common practice that through the momentum of the machine the wort will find the route of least resistance. While knives for the purpose of manipulating the grain or mash have been considerably improved, it is still possible for wort to find its exit at the shell of the tub as well as at the center of the tub, thereby leaving the center channel or compartment or V bottom, as a rule, with the heaviest wort. The improvements described make it possible to throttle the outer V bottom channel or compartment and the inner V bottom channel or compartment to the same specific gravity as the center channel, thus running off a uniform wort on the three channels or compartments. Each of the wort distributing pipes is provided with a saccharometer which registers the specific gravity independently of one another.

A further advantage of the V-shaped bottom is the elimination of under dough which is usually formed on the conventional straight bottomed tank. This under dough retards the flow, as the wort actually must form channels through the same to the outlet, whereas by the use of the V bottom the draw-off is at the lowest point of each compartment, thereby eliminating the obstacle and increasing the draw-off capacity. In connection with this draw-off system, a smaller grant and a single loop seal draw-off method is utilized, which prevents air locks from developing underneath the bottom, but as this forms no part of the invention, it is not described in detail nor shown in the drawing.

It is obvious that various changes and modifications may be made in the details of construction and design of the above specifically described embodiments of this invention without departing from the spirit thereof, such changes and modifications being restricted only by the scope of the following claims.

What I claim is:

1. In a lauter tank having a vessel for the reception of grains, and having a false inner bottom spaced from its outside bottom, with a plurality of annular rings sealing separate compartments from each other, said circular compartments being formed between the false inner bottom and the outside bottom, a manifold for each circular compartment gradually increasing in diameter, a plurality of nozzle-like pipes connecting each manifold with the interior of each compartment to receive the wort gathered in such compartment, a rate of flow valve for each manifold and a grant for the collecting of the wort of each compartment at the rate of flow valves controlling the specific gravity of the wort to the grant.

2. In a lauter tank having a vessel for the reception of grains, and having a false inner bottom spaced from its outside bottom, with a plurality of annular rings sealing separate compartments from each other, said circular compartments being formed between the false inner bottom and the outside bottom, a manifold for each circular compartment gradually increasing in diameter, a plurality of pipes connecting each manifold with the interior of the compartments to receive the wort gathered in such compartment, a rate of flow valve for each manifold, an inclined discharge means below the false inner bottom for guiding the wort to said pipe and a grant for the collecting of the wort of each compartment, the rate of flow valves controlling the specific gravity of the wort to the grant.

3. In a lauter tank having a vessel for the reception of grains, a false inner perforated bottom spaced from the lowermost end of said vessel, an outside imperforate bottom to receive the matter from said false bottom, a plurality of circular separators forming separate annular compartments between said bottoms, said outside bottom having discharge openings circumferentially spaced for each annular compartment, and means communicating with each opening and below the outside bottom for conducting away the material passing through each opening.

4. In a lauter tank having a vessel for the reception of grains, a false perforated inner bottom, a plurality of concentric rings below the inner bottom dividing the bottom into separate concentric bands, concentrically disposed outside bottoms, one for each of said bands, each having inclined walls converging substantially at the lowest point of said outside bottom, and having discharge openings at said lowest points, and concentrically disposed pipes connected with said discharge openings for conveying the contents from the inclined walls away from the same.

ROBERT C. SCHOCK.